(12) United States Patent
Aniolek et al.

(10) Patent No.: US 9,790,119 B2
(45) Date of Patent: Oct. 17, 2017

(54) THERMAL CONTROL OF THE BEAD PORTION OF A GLASS RIBBON

(71) Applicant: Corning Incorporated, Corning, NY (US)

(72) Inventors: Kenneth William Aniolek, Painted Post, NY (US); Steven Roy Burdette, Big Flats, NY (US); Vladislav Yuryevich Golyatin, Avon (FR); Ilia Andreyevich Nikulin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 11 days.

(21) Appl. No.: 14/442,234

(22) PCT Filed: Nov. 22, 2013

(86) PCT No.: PCT/US2013/071412
§ 371 (c)(1),
(2) Date: May 12, 2015

(87) PCT Pub. No.: WO2014/082000
PCT Pub. Date: May 30, 2014

(65) Prior Publication Data
US 2016/0297703 A1    Oct. 13, 2016

Related U.S. Application Data

(60) Provisional application No. 61/729,805, filed on Nov. 26, 2012.

(51) Int. Cl.
*C03B 17/06*    (2006.01)

(52) U.S. Cl.
CPC .......... *C03B 17/067* (2013.01); *C03B 17/064* (2013.01)

(58) Field of Classification Search
CPC ...................................... C03B 17/00
See application file for complete search history.

(56) References Cited

U.S. PATENT DOCUMENTS 3,682,609 A * 8/1972 Dockerty .............. C03B 17/067
65/203
4,375,370 A    3/1983 Mouly
(Continued)

FOREIGN PATENT DOCUMENTS

CN    101891374 A    11/2010
CN    101891375 A    11/2010
(Continued)

OTHER PUBLICATIONS

TW102143093 Search Report Dated Dec. 16, 2016, Taiwan Patent Office.
Chinese First Office Action CN201380071146.9 Dated Dec. 5, 2016.

*Primary Examiner* — Cynthia Szewczyk
(74) *Attorney, Agent, or Firm* — John L. Haack

(57) ABSTRACT

An apparatus for making a laminate glass ribbon, the glass ribbon having: a center laminate region, a first edge, a second edge, and first, second, third, and fourth, beads portions as defined herein, the apparatus includes: a bead thermal conditioning region including: a fluid source for selectively applying a fluid to one or more of the first, second, third, and fourth bead portions. Also disclosed is a method for bead thermal conditioning in the disclosed laminate fusion apparatus.

14 Claims, 12 Drawing Sheets

(56) References Cited

U.S. PATENT DOCUMENTS

| | | | |
|---|---|---|---|
| 6,015,619 A | 1/2000 | Schnabel, Jr. et al. | |
| 8,037,716 B2 | 10/2011 | Aniolek et al. | |
| 2005/0122025 A1 | 6/2005 | Kuin et al. | |
| 2005/0166639 A1 | 8/2005 | Skeen et al. | |
| 2007/0062219 A1 | 3/2007 | Blevins et al. | |
| 2007/0190340 A1* | 8/2007 | Coppola | B32B 17/06 428/432 |
| 2010/0218557 A1 | 9/2010 | Aniolek et al. | |
| 2011/0094267 A1* | 4/2011 | Aniolek | C03B 17/064 65/91 |
| 2011/0289967 A1 | 12/2011 | Burdette | |

FOREIGN PATENT DOCUMENTS

| | | |
|---|---|---|
| WO | 2006083902 | 8/2006 |
| WO | 2007037871 | 4/2007 |
| WO | 2008036227 | 3/2008 |

\* cited by examiner

THERMAL CONTROL OF THE BEAD PORTION OF A GLASS RIBBON

This application claims the benefit of priority to U.S. Application No. 61/729,805 on Nov. 26, 2012, the content of which is incorporated hereby by reference in its entirety.

The entire disclosure of any publication or patent document mentioned herein is incorporated by reference.

BACKGROUND

The disclosure generally relates to thermal control of the bead portion of a glass ribbon or a laminate glass ribbon in a fusion draw process.

SUMMARY

The present disclosure provides and apparatus and method for thermal control of the bead portion of a glass ribbon or a laminate glass ribbon in a fusion draw process. The thermal control of the bead portion can provide glass sheet or laminate glass sheet products having superior stress properties.

BRIEF DESCRIPTION OF THE FIGURES

In embodiments of the disclosure.

DETAILED DESCRIPTION

Figure 1:
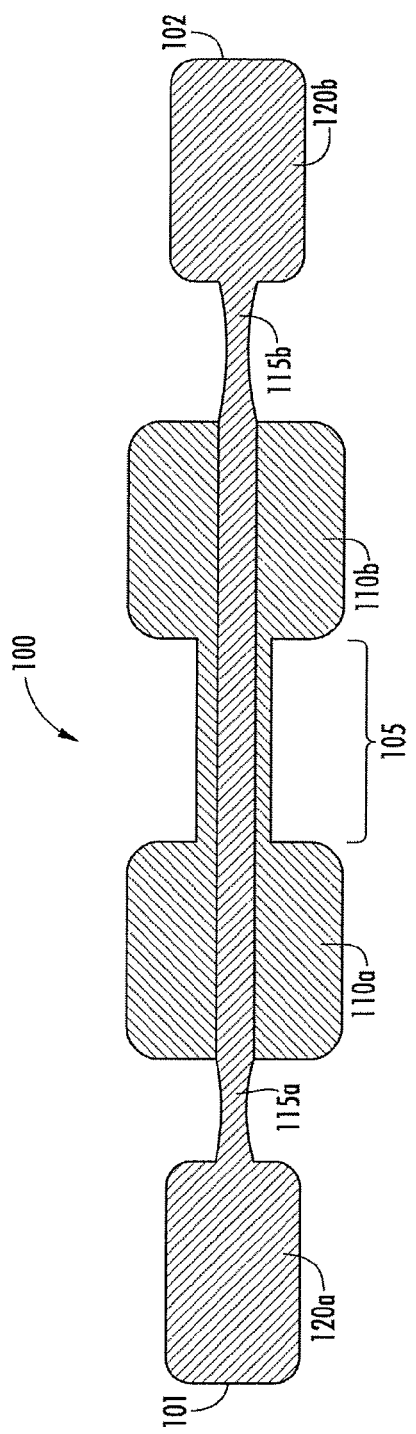
FIG. 1 shows a bead ribbon thickness or cross-section profile of a laminate fusion ribbon (100) viewed in the direction of glass flow into or out of the plane of the page.

Various embodiments of the disclosure will be described in detail with reference to drawings, if any. Reference to various embodiments does not limit the scope of the invention, which is limited only by the scope of the claims attached hereto. Additionally, any example(s) set forth in this specification are not limiting and merely set forth some of the many possible embodiments of the claimed invention.

Definitions

In embodiments, "fluid" refers to, for example, a substance, such as a liquid or gas, tending to flow or conform to the outline of its source container and delivery apparatus, until discharged toward the glass ribbon work piece. In embodiments, "fluid" can also refer to, for example, radiation or source of light or heat, such as a radiant heater that can provide selective illumination or heating to the glass ribbon work piece when such fluid is properly directed and discharged.

"About" modifying, for example, the quantity of an ingredient in a composition, concentrations, volumes, process temperatures, process time, yields, flow rates, pressures, and like values, and ranges thereof, employed in describing the various embodiments of the disclosure, refers to variation in the numerical quantity that can occur, for example: through typical measuring and handling procedures used for making articles, compositions, composites, concentrates or use formulations; through inadvertent error in these procedures; through differences in the manufacture, source, or purity of starting materials or ingredients used to carry out the methods; and like considerations.

"Consisting essentially of" in embodiments refers, for example, to a method, a composition, an article, a device, or an apparatus of the disclosure, and can include the components or steps listed in the claim, plus other components or steps that do not materially affect the basic and novel properties of the compositions, articles, apparatus, or methods of making and use of the disclosure, such as particular reactants, additives, ingredients, agents, a condition, or like structure, material, or process variable selected. Items that may materially affect the basic properties of the components or steps of the disclosure or that may impart undesirable characteristics to the present disclosure include, for example, no or very low temperature control in the bead and trough regions of the glass ribbon, and like contrary properties or steps.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), and "rt" for room temperature, and like abbreviations).

Specific and preferred values disclosed for components, ingredients, additives, and like aspects, and ranges thereof, are for illustration only; they do not exclude other defined values or other values within defined ranges. The formulations, compositions, devices, apparatus, and methods of the disclosure can include any value or any combination of the values, specific values, more specific values, and preferred values described herein.

The cross-draw thickness profile of the glass ribbon in a laminate fusion draw machine (LFDM) is typically non-uniform. The bead (edge) zone of the glass contains regions that can be, for example, alternately thicker, thinner (at least locally), and then thicker than the quality zone, i.e., the middle or center region, of the glass ribbon or resulting cut glass sheet or glass roll product. This results in a temperature profile that contains local maxima and minima in the bead region. For most of the ribbon's length the thick portion of the bead is relatively hotter compared to the center of the ribbon. Relatively high temperatures and accompanying thermal gradients in the ribbon edge may cause undesirable stress and shape in both the ribbon and the final glass product. An ability to specifically control the glass temperature in the ribbon edge region allows for better control of stress and shape of the glass or laminate glass ribbon (i.e., continuous draw material), glass roll, or glass sheet (i.e., individual cut or separated sections of the ribbon). Thermal conditioning in the bead regions can include, for example, cooling, heating, or a combination of the two.

Also, for the specific case of laminate fusion, a high delta coefficient of thermal expansion (CTE) between the core and clad component glasses can create a significant tensile stress in the core glass under the clad bead as the ribbon grows. These tensile stresses interact with the temporary and residual stresses (since they can occur in the same plane) and can, in turn, cause instabilities, and can be especially dangerous during sheet formation or separation, potentially leading to crack-outs, i.e., mild breakage below the rollers, and rubicons, i.e., more severe breakage including uncontrolled cracking or shard formation.

The cross-draw temperature profile of the glass ribbon inside a laminate fusion draw machine (LFDM) or fusion draw machine (FDM) can be shaped by the use of heat transfer methods, for example, resistance windings and cooling bayonets. The primary object of the temperature profile is to manage the quality zone toward the center of the ribbon, see for example commonly owned and assigned co-pending U.S. patent application Ser. No. 13/679,263, filed Nov. 16, 2012. However, these heat transfer methods are not intended to alter the bead temperature in a fusion sheet drawing processes. In the bottom-of-draw (BOD) region the glass ribbon is allowed to cool naturally, mainly through free convection and radiation.

Commonly owned and assigned U.S. Pat. No. 8,037,716, mentions a method to control the temperatures in the edge region of a glass ribbon with a relatively thick single bead on the very edge of each side of the ribbon. Cooling was mentioned as a control method. The '716 patent does not mention laminate fusion using dissimilar glasses having mismatched CTEs. No mention was made of double beads, or the use of active heating, or active heating and cooling combinations, as a ribbon edge thermal control method.

Other devices that employ cooling in the manufacture of other types of glass are known. For example, US 2006/0015619 mentions a cooling ring assembly specially designed to cool the edges of vehicle glass manufacture for stress control. US 2005/0166639 mentions an apparatus for edge cooling of a pair of shaped glass sheets while supported on an outline mold to increase edge compression. The US 2005/0166639 application also mentions auto glass manufacturing with cooling accomplished with air or other gasses. WO 2006/083902 mentions peripheral quenching by cooling with cold air to strengthen the edges of window pane glass. U.S. Pat. No. 4,375,370 also mentions the application of edge-cooling in the manufacturing of flat glass to reduce "scalloping" between pulling rolls. Peripheral cooling has also been mentioned in the manufacture of CRT glass, for example, US 2005/0122025 where such cooling is used to increase strength.

WO 2007/037871 and US 2007/0062219 mention the use of edge heating to reduce the level of S-warp in the edges of manufactured flat glass sheets. The process includes both fusion and float processes where the edge rollers result in localized cooling of the beads near the glass transition temperature range (GTTR), in turn resulting in an S-warp of the final glass sheet. These two disclosures do not cover ribbon shape control or bead cooling. WO 2008/036227 mentions a procedure for controlling the distortion in flat glass sheets through manipulation of the setting zone temperature profile in a fusion draw process. The setting zone is the region where the ribbon transitions from the viscous zone to the elastic zone. The present disclosure provides a superior method for controlling ribbon distortion in a fusion draw machine, especially for the special considerations in laminate fusion draw.

The present disclosure provides methods for thermal control of the bead portion of a laminate glass ribbon. The method can alter the temperature inside the relatively thick and thin portions of the glass near the edges, known as the bead or beads, of the ribbon in a laminate fusion draw machine. In the absence of proper thermal control there can be a relatively large local temperature gradient in the glass ribbon. In a laminate fusion glass ribbon, there are alternating thick-thin-thick glass regions near the ribbon edge, and any or all of those regions can be used for specific thermal control. Thermal gradients in this region can lead to non-optimized ribbon stresses and shapes. Temperature gradients can be reduced, or amplified, if needed, by altering the bead temperatures, which can provide other improvements, which can include, for example: improved sheet scoring and separation, lower levels of ribbon motion during scoring, and manipulation of the stress and shape of the final glass product. The method of laminate glass ribbon bead temperature alteration can involve heating, cooling, or both heating and cooling, depending on, for example, the region of the bead, the region of the ribbon, and the thickness profile desired. The bead temperatures can be altered by external heating or cooling means in, for example, the fusion draw machine region (FDM), the bottom-of-draw region (BOD), or both regions, depending on what property or advantage is being targeted. If bead cooling is called for, a preferred method includes convective gas jet cooling, such as a nozzle providing a cool gas knife, a vacuum take-off, or a combination thereof. If bead heating is called for, a preferred method includes where the fluid source is radiant heat, heated-gas heat transfer, or both.

In embodiments, the method of laminate glass ribbon bead temperature alteration for the purpose of thermal control, can include, for example, simultaneously:

cooling the first and the second beads (i.e., outer beads) that comprise the core glass on opposite sides or edges of the laminate ribbon;

cooling the third bead and the forth bead portions (i.e., inner beads) that comprise the clad glass of the laminate ribbon; and heating the first and second bead troughs that comprise the core glass situated between the outer bead and the inner beads.

The ability to control the bead temperatures in the fusion draw process can manipulate, for example: the formation of residual stress; any temporary stress resulting from non-linearities in the local temperature profile; and avoid laminate stress arising from the CTE mismatch between the core glass and the clad glass. The residual stress depends in part on the temperature profile in the setting zone (i.e., the viscos-elastic zone) and the temporary stress depends on the temperature in the elastic zone. These stresses combine to give the overall stress state. Altering the bead temperatures at various locations in the draw can provide control over one or more stresses in the entire ribbon.

Manipulation of the residual stress, temporary stress, or both can lead to practical advantages, such as: alteration of the ribbon shape in both the fusion draw machine (FDM)

and the bottom-of-draw (BOD) regions; improved sheet scoring and separation (both of which are dependent on the ribbon shape near the transverse anvil machine mechanism (TAM) used for scoring); lower levels of ribbon motion during scoring and separation (which is also dependent on the shape of the ribbon near the TAM); and control of the shape of the final glass sheet, which depends on the residual stress. The disclosed bead thermal conditioning process can provide, for example, a laminate glass ribbon having a temporary stress below the fracture limit near the beads, for example, about 10000 psi or less.

Manipulation of the laminate stresses in either the viscoelastic zone or the elastic zone (e.g., the BOD), by the addition of residual or temporary compression through appropriate thermal conditioning of the beads, can mitigate core tensile stresses and minimize potential sheet and bead separation problems. For example, consider Corning EAGLE XG® and GORILLA® as the clad and core glasses, respectively, having the combined clad and core glass near the inner bead having a thickness of about 2.5 times the thickness of the core alone. Glass ribbon having a thickness ratio (which is equal to: core thickness/2 clad thickness) near the clad bead (i.e., the inner bead) can be, for example, about 2.5. For 350° C. a BOD temperature tensile stress in the core glass can be, for example, up to 50 MPa, which level is high enough to cause glass breakage and process instability. By locally heating the inner bead(s) by an additional 50° C. above the BOD temperature, the tensile stress can be reduced by about 30 MPa (estimated by the formula: Stress=Young's Modulus*CTE*Delta T=70/GPa*90/ppm/ C*50° C.), and bring the stress level down to a manageable level, such as about 20 MPa. If one considers a laminate sheet having beads, where the sheet is separated or cut from the ribbon and cooled to room temperature, a stress of 120 MPa or more is estimated for the clad bead, which can cause non-passive failure. While this can be difficult to mitigate with temporary thermal stress (e.g., which calls for about 150° C. local heating), the temporary thermal stress can be managed through the manipulation of the residual stress by the disclosed bead thermal conditioning process in the visco-elastic region as disclosed herein.

In embodiments, and in reference to FIG. 1, the disclosure provides an apparatus for making a laminate glass ribbon work piece, the glass ribbon having:
a center (105) laminate region, that is, a line in the middle of the width and parallel to the ribbon's edge,
a first edge (101),
a second edge (102),
a first bead portion (120a), that is, the core bead or outer bead, which begins at the first edge and extends towards the center (105) laminate region,
a second bead portion (120b), that is, the core bead or outer bead, which begins at the second edge and extends towards the center laminate region,
the first bead portion and the second bead portion comprise the core glass on opposite edges of the laminate ribbon (100),
a third bead portion (110a), that is, clad bead or inner bead, which begins away from the first edge and extends towards the center (105) laminate region,
a forth bead portion (110b), that is, the clad bead or inner bead, which begins away from the second edge and extends towards the center (105) laminate region,
the third bead and the forth bead portions comprise the clad glass of the laminate glass ribbon,
a first optional bead trough region (115a) between the first (120a) and third (110a) bead portions, and
a second optional bead trough region (115b) between the second (120b) and fourth (110b) bead portions,
the first and second optional bead trough regions comprise the core glass.

In embodiments, the apparatus can comprise:
a bead thermal conditioning region in the laminate draw region including:
a fluid source, for example, a pressurized gas having associated conduits, control valves, and dispense components, such as jets, nozzles, or like directing or regulating mechanisms, oriented to selectively apply a fluid proximate to at least one of the first, second, third, or fourth bead portions, and combinations thereof, and optionally the bead trough regions, of the laminate glass ribbon.

In embodiments, the fluid source can be situated in the visco-elastic region (aka. the setting zone) the elastic region, or combinations thereof, in the laminate draw region.

In embodiments, the fluid source can be, for example, a first nozzle providing a source of cooling and a second nozzle providing a source of heating, or alternatively, a first nozzle providing a source of heating and a second nozzle providing a source of cooling.

In embodiments, the fluid source can be, for example, a source of a cool fluid or vacuum, for example, a cooled or refrigerated gas, directed toward the first and second beads, and the third and fourth beads, that is, the thick inner beads, and a source of a heated fluid, for example, a heated gas, directed toward the first and second bead optional troughs, that is, the thinner regions between the outer and inner beads (115a, 115b).

In embodiments, the action of the apparatus can modify the residual stress, for example, reducing stress in a resulting laminate glass sheet.

In embodiments, the fluid source can be, for example, at least one gas nozzle, such as a single nozzle on one side, a pair of nozzles on opposite sides of the ribbon, or a plurality of paired nozzles on opposite sides of the ribbon, oriented orthogonally toward the ribbon's long cross-section axis or oriented acutely with respect to the ribbon's long cross-section axis and projecting toward the ribbon edge and away from the center.

In embodiments, the fluid source can be, for example, a plurality of gas nozzles oriented orthogonally toward the ribbon's long cross-section axis, oriented acutely with respect to the ribbon's long cross-section axis and projecting toward the ribbon edge and away from the ribbon's center laminate region, or a combination thereof.

In embodiments, the fluid source can be, for example: a chilled gas or vacuum, a heated gas, a chilled liquid, a heated liquid, a radiation source, such as a light beam or a radiant heater, or a combination thereof.

In embodiments, the disclosure provides a method for bead thermal conditioning in the above described laminate fusion apparatus comprising:
in the bead thermal conditioning region of the apparatus:
directing a first fluid from the fluid source toward at least one of the first, the second, the third, and fourth bead portions, that is, the thicker inner beads, the thicker outer beads, or both, optionally directing a first fluid from the fluid source toward the toward the first and second bead portions; and
simultaneously directing a second fluid from a second fluid source toward the first and second optional bead trough portions, that is, the thinner cross-section regions between the outer and inner beads (115).

In embodiments, the bead thermal conditioning can provide a laminate glass sheet having an "averaged through" thickness residual stress, i.e., the clad and the core may have very large stresses that can be viewed as residual, of from −1,000 psi to about +1,000 psi, or less (where 1000 psi=6.89 MPa). In the quality area of the ribbon there can be, for example, less than about 250 psi absolute stress averaged through the thickness for many glass sheet products. Residual stress is an inherent stress that remains in the glass sheet whereas temporary stress is transient and abates when the glass sheet approaches thermal equilibrium. The disclosed bead thermal conditioning method can provide a laminate glass ribbon or sheet having a averaged through thickness residual stress in the quality area of, for example, from −1,000 psi to about +1,000 psi, from −500 psi to about +500 psi, from −250 psi to about +250 psi, from −100 psi to about +100 psi, or less, including intermediate values and ranges. The residual stress is preferably, for example, from −50 psi to about +50 psi, or less, and more preferably approaches zero or is zero.

In embodiments, the fluid source that is directed toward the first and second optional bead trough portions can be, for example, a forced-air convection heater that localizes, i.e., locally maintains, the temperature change or temperature gradient in the respective optional bead trough portions.

In embodiments, the temperature change or temperature gradient can be minimized or maintained, for example, within a temperature change or gradient of from 5 to about 150° C., and preferably from 25 to about 100° C., including intermediate values and ranges. In embodiments, the fluid can be, for example, a gas, a vacuum, or combination thereof, and the gas can be, for example, air or other than air, such as nitrogen, argon, helium, or like gases or mixed gases. Helium has high thermal conductivity and is an excellent choice for enhancing cooling.

In embodiments, the gas can be combined with or include at least one of water vapor, liquid water, a non-aqueous liquid, or combinations thereof.

In embodiments, the first fluid can be, for example, a first cooled gas directed toward at least one of the relatively thick first, second, third, or fourth bead portions, and the second fluid can be, for example, a second heated gas directed toward at least one of the relatively thin optional bead trough regions.

In a dual isopipe fusion laminate process, the ribbon contains two beads compared to just one for the conventional single isopipe fusion draw process. A two bead ribbon having two beads on each edge or end is shown in FIG. 1. The quality zone (105) in the center of the ribbon is the widest portion (not to scale) and is surrounded by the relatively narrow but thick inner bead regions (110), the relatively thin optional intra-bead regions or "bead troughs" (115a, 115b), and the relatively thick outer bead regions (120a, 120b). The relative thicknesses and lengths of each region are not to scale and have been exaggerated for understanding. The relatively thick inner bead regions can have a thickness that is comparable to, less than, or greater than the relatively thick outer bead regions.

Figure 2:
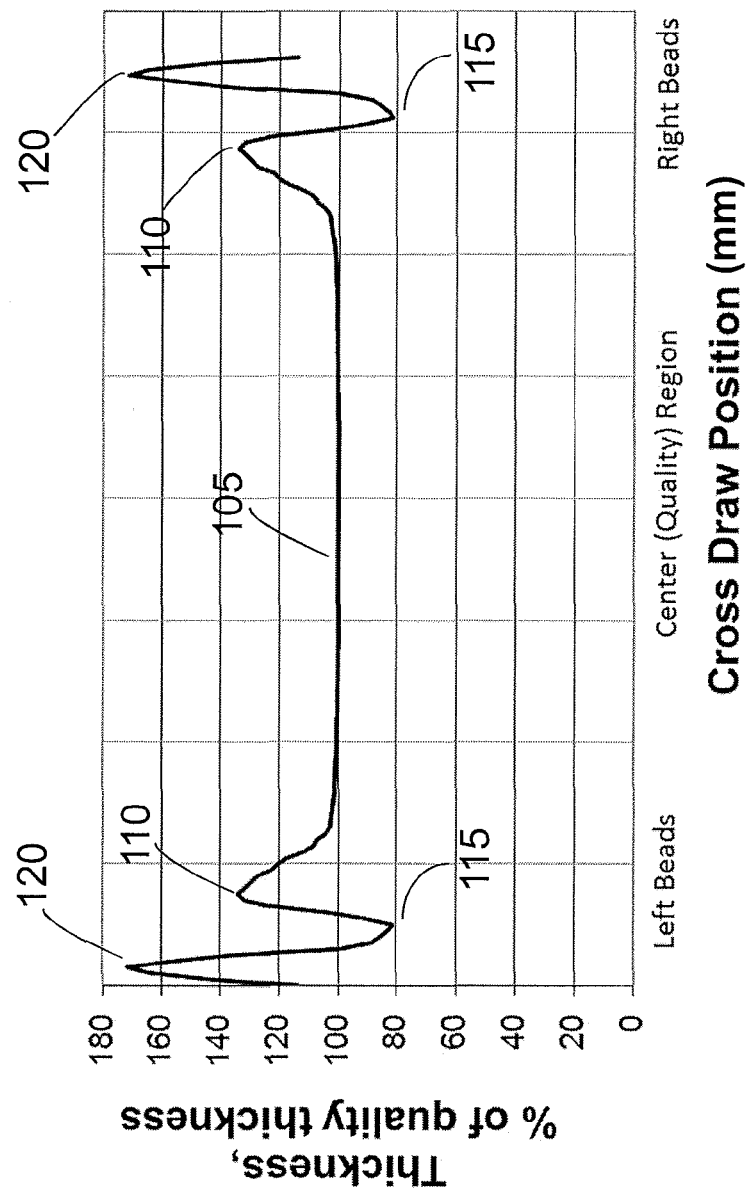
FIG. 2 shows an exemplary across-the-draw (ATD) ribbon thickness profile from a laminate fusion process.

The inner bead (110) and an outer bead (120), can both be characterized by, for example: glass that is relatively thick compared to the ribbon quality zone (105) (sellable glass); and the intervening glass that can be relatively thin compared to the beads and is referred to as a bead trough region (115). The inner bead can also be referred to as the clad bead and the outer bead as the core bead, referring to their relation to the clad and core portions of the laminated glass. In embodiments, the bead trough can be, for example, the same thickness or thinner than the thickness of the quality zone. An example of the thickness variation seen in the across-the-draw (ATD) direction is shown graphically in FIG. 2. The bead regions shown in FIG. 1 are indicated in FIG. 2 with the same reference numerals.

Figure 3:
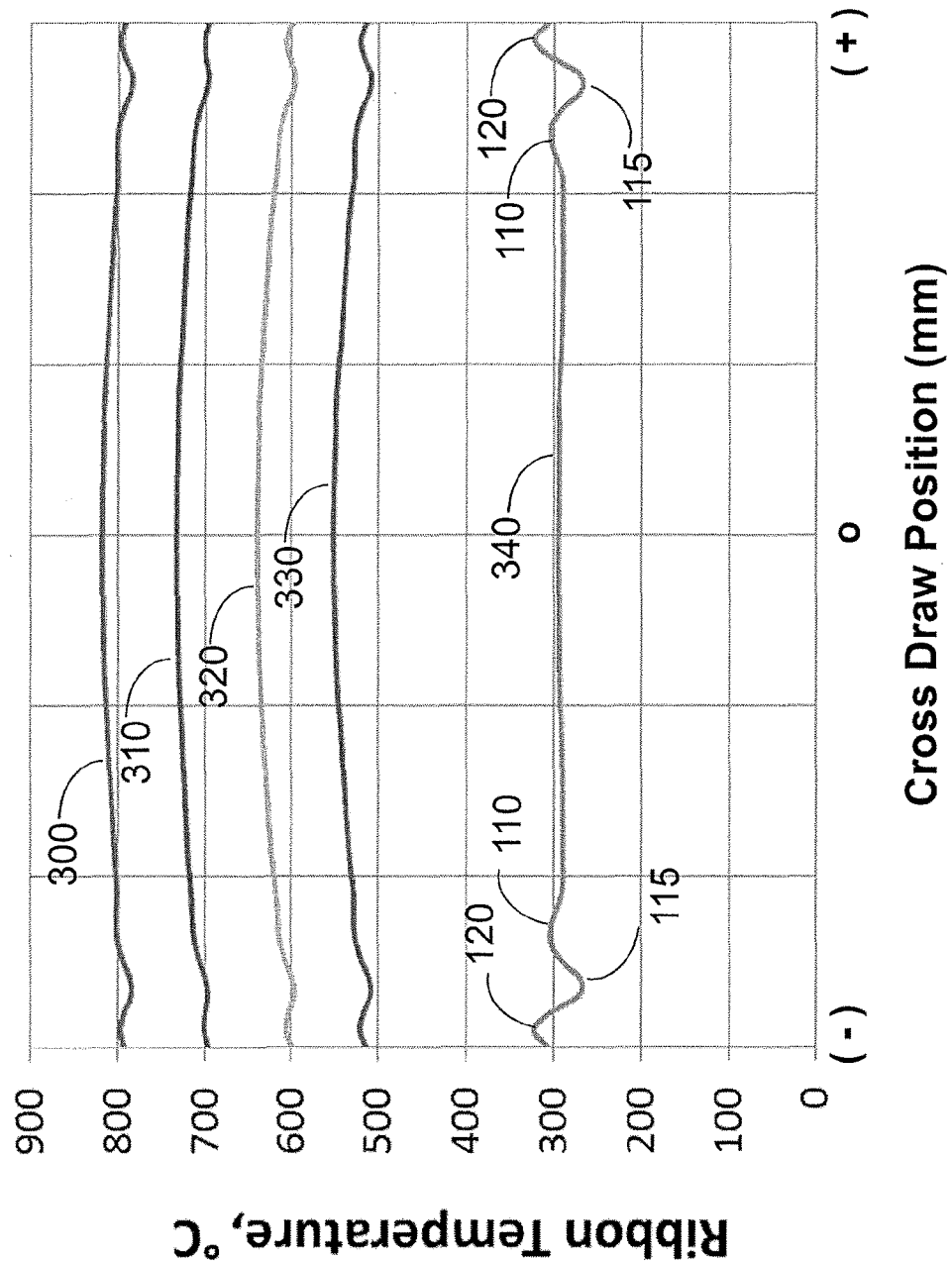
FIG. 3 shows exemplary across-the-draw (ATD) ribbon temperature profiles at various down-the-draw (DTD) locations.

When there are glass thickness differences, the laminate glass can transfer energy differently in the different regions. The variation in glass thickness can lead to a variation in the ribbon temperature in these regions depending, for example, on the local convection and radiation to the surroundings. The thicker regions retain more heat and tend to be relatively hotter than the nearby relatively thin regions. This effect can be seen in the computer model-simulated across-the-draw (ATD) temperature profiles shown in FIG. 3 at various down-the-draw locations, where the very edge of the ribbon has a local temperature maximum corresponding to the outer bead (120). The local temperature minimum slightly inboard of this temperature maximum feature corresponds to the relatively thin bead trough region (115). Low in the ribbon draw there is also a second temperature maximum that corresponds to the inner bead (110). Both maxima may not present higher in the fusion draw machine due to mitigating local convection and radiation effects and the particular power setup selected in the upper part of a fusion draw machine. The profiles or elevations have higher ribbon temperatures higher up in the draw (e.g., 300, 310, 320 and 330) and have lower temperatures lower down in the draw (e.g., 340).

In embodiments, the relatively thick bead portions (110 and 120) of the glass ribbon can be cooled to provide a relatively flatter temperature profile. In embodiments, the cooling can be directed to just the inner bead, just the outer bead, or both. In embodiments, the cooling can occur continuously down the draw from the top of the FDM to the bottom of the BOD where the glass sheet is separated from the ribbon. In embodiments, the cooling can occur at discrete locations in both the FDM and BOD, in just the FDM, or in just the BOD. The location of the cooling can determine what attribute is to be affected, for example: cooling high in the FDM (near the setting zone) can affect residual stress and nearby temporary stress and the stress and shape of the ribbon and final glass sheet; and cooling low in the FDM or BOD can mostly affect the temporary stress and consequently the ribbon shape low in the draw. Although additional benefits can also include, for example, reduced motion and altered stress in the setting zone.

In embodiments, the relatively thin region in between the thick inner and outer bead regions, that is the trough if present, can be heated to result in a relatively flatter temperature profile. The target region for thermal control could also be slightly inboard of the inner bead close to and perhaps including the quality zone. In embodiments, the heating can occur continuously down the draw from the top of the FDM to the bottom of the draw (BOD) where the glass sheet is separated from the ribbon. Additionally or alternatively, heating can occur at discrete locations in both the FDM and BOD, in just the FDM, or in just the BOD.

In embodiments, a preferred method of cooling or heating is trough forced-gas or air convection having jets directed toward localizing or minimizing the temperature change or temperature gradient within the targeted regions. The size of the affected area can be engineered by, for example, selecting the size of the jet orifice, the distance between the jet and the glass, the gas jet flow rate, or the angular dispersion of gas on the gas jet. The gas jet orifice can be, for example, circular or rectangular such as in an air knife or air curtain.

In embodiments, the heating can be accomplished by, for example, by a collimated radiative process.

Some example illustrations of embodiments of the disclosure are shown in FIGS. 4 to 10. Other embodiments of the disclosure can include, for example, variations or permutations on the number of different nozzles, various different across-the-draw (ATD) positions, various multiple down-the-draw (DTD) location positions, various different gas flow rates for various nozzles, radiative heating, and like modifications or variations.

Figure 4A:
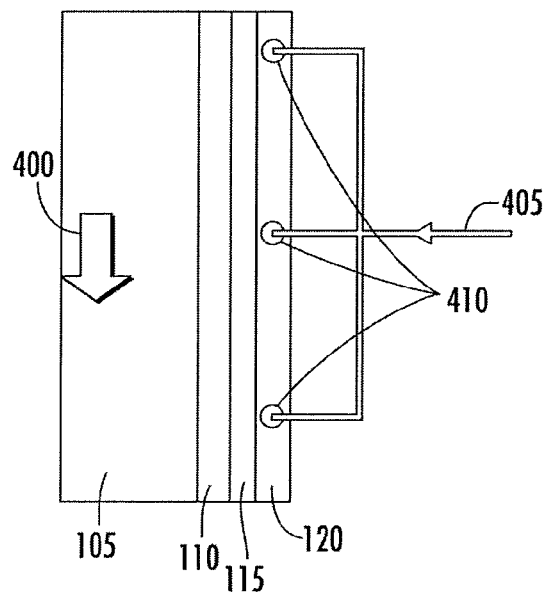
FIGS. 4A and 4B, respectively, show two alternative configurations for the disclosed bead thermal conditioning apparatus.
Figure 4B:
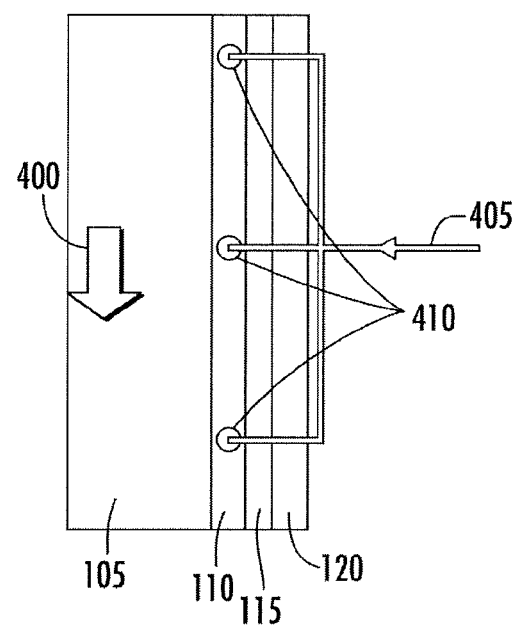

FIGS. 4A and 4B, respectively, show two variants for a bead thermal conditioning apparatus. FIG. 4A includes three discrete nozzles (410) directed at the outer bead (120). FIG. 4B includes three discrete nozzles (410) directed at the inner bead (110). The temperature of the supplied fluid (405), such as a gas, can be hotter or cooler than the local bead temperature. The draw direction is indicated by the arrow (400). Only a portion of the right side or the right half of the glass ribbon and associated thermal control apparatus is shown in FIGS. 4 to 10.

Figure 5A:
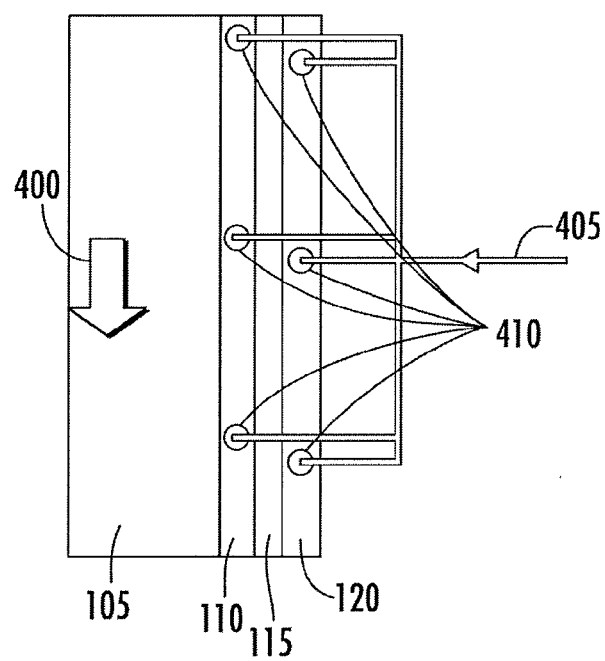
FIGS. 5A and 5B show two alternative configurations for the disclosed bead thermal conditioning apparatus.
Figure 5B:
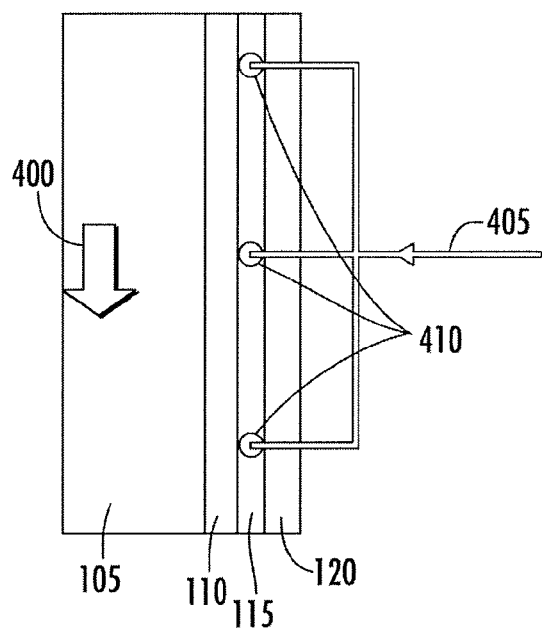

FIGS. 5A and 5B show two variants for a bead thermal conditioning apparatus. The bead thermal conditioning apparatus of FIG. 5A has a total of six nozzles (410) situated at the ribbon edge region (one edge shown) supplied by the fluid source (405) where three discrete nozzles are directed at the outer bead (120) and three nozzles directed at the inner bead (110) using a common gas manifold. The bead thermal conditioning apparatus of FIG. 5B has three discrete nozzles directed at the bead trough region (115) having a relatively thin glass thickness. A relatively thin glass bead trough region can be, for example, from about 0.25 mm to 1 mm, about 0.3 mm to 0.8 mm, including intermediate values and ranges. A relatively thick glass bead region can be, for example, from about 1.0 mm to 3.0 mm, and from about 1.3 mm to 1.5 mm, including intermediate values and ranges.

The temperature of the supplied gas (405) can be hotter or cooler than the local bead temperature. The draw direction (400) and other features are as is indicated FIGS. 4A and 4B. Only a portion of one side or half of the glass ribbon and associated thermal control apparatus is shown. The fluid, such as a gas, a gas saturated with a liquid, or a liquid, can be hotter or colder than the local glass temperature. The number of nozzles in each of FIGS. 4 and 5 can be two or more, such as 2 to about 10 nozzles.

Figure 6:
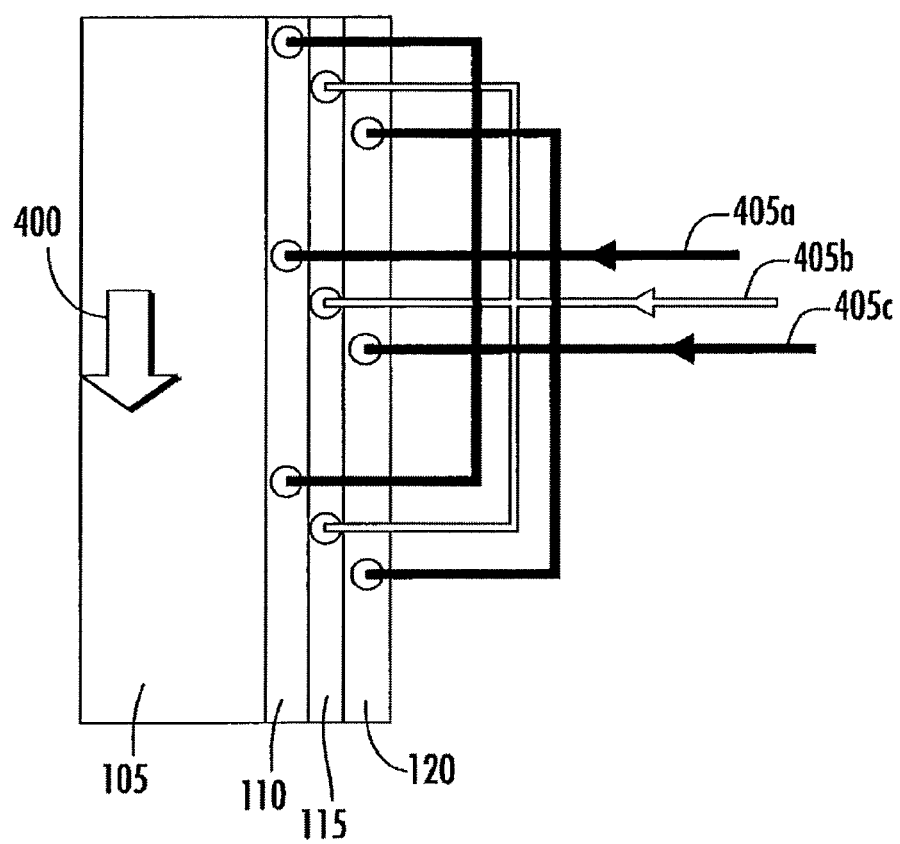
FIG. 6 shows another alternative configuration of the disclosed bead thermal conditioning apparatus.

In embodiment, an alternative bead thermal conditioning apparatus is shown in FIG. 6. The alternative configuration provides simultaneous conditioning of both inner and outer beads and the optional bead trough region. Any combination of separately delivered, heated or cooled fluids, such as gasses (e.g., 405a, 405b, 405c) can be used. A preferred embodiment can include, for example, using a first gas source including one or more nozzles providing cooled gasses and directed on or towards the thick beads (110, 120), and a second gas source including one or more nozzles providing heated gas directed on the relatively thin bead trough regions (115). Only a portion of one side or half of the glass ribbon and associated thermal control apparatus is shown. In embodiments, a preferred thermal control method includes cooling the thick bead portions and heating the thin portions in the visco-elastic zone. In embodiments, a preferred thermal control method in the elastic zone, for example in the bottom of draw, includes heating the inner bead portions if the difference in the CTEs between the clad and the core is significant. Heating the clad beads in the bottom of draw can generate temporary compressive stress that can offset laminate tensile stress in the core. For the specific instance of laminate fusion having a core glass having a CTE higher than the CTE of the clad glass, a preferred embodiment can have heated gas directed on the inner bead to offset tensile stresses rising in the core due to the delta CTE.

Figure 7:
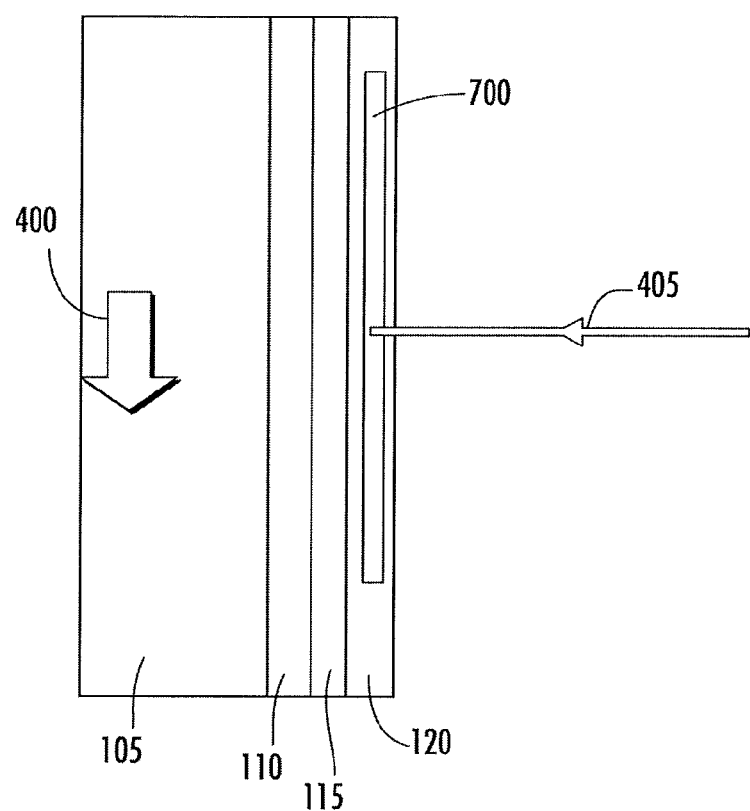
FIG. 7 shows another alternative configuration of the disclosed bead thermal conditioning apparatus.

FIG. 7 shows an alternative to the configuration of FIG. 4, where a continuous supply of a first fluid, such as a conditioning gas (405) manifold in the form of a heating or cooling fluid, such as a gas "knife" (700) can be directed at the outer bead region (120) to deliver a uniform flow of gas along entire "knife" region (700). In embodiments, the knife can be directed at any or all of the bead regions (110, 120) including the optional bead trough regions (115). Only a portion of the right side or half of the glass ribbon and associated thermal control apparatus is shown.

Figure 8:
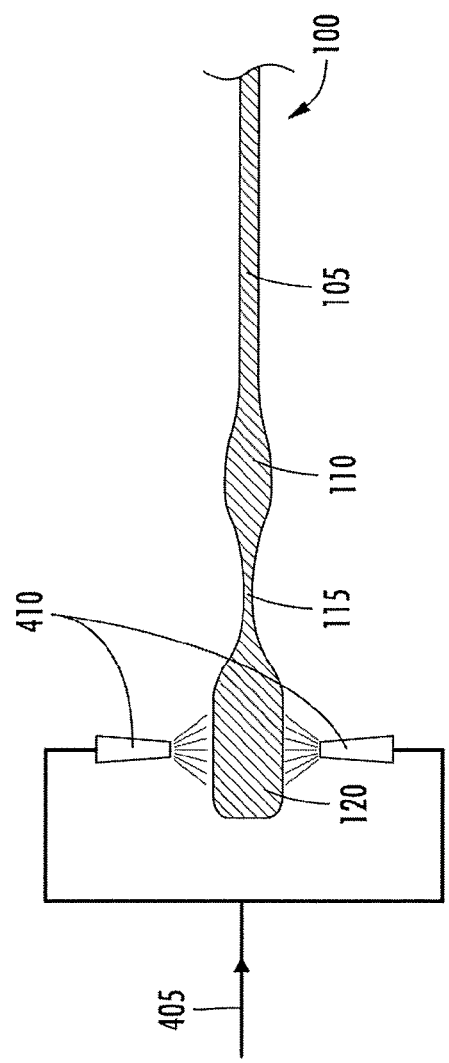
FIG. 8 shows a portion of the glass ribbon in cross-section as in FIG. 1 that illustrates a configuration having a fluid source including a pair of opposed cooling or heating nozzles directed at the outer bead (120).

FIG. 8 shows portion of the laminate glass ribbon in cross-section illustrating a configuration having a fluid source (405) including a pair of opposed cooling or heating gas nozzles (410) directed at the outer bead (120). These gas nozzles (e.g., jets) are oriented orthogonally to the ribbon.

Figure 9:
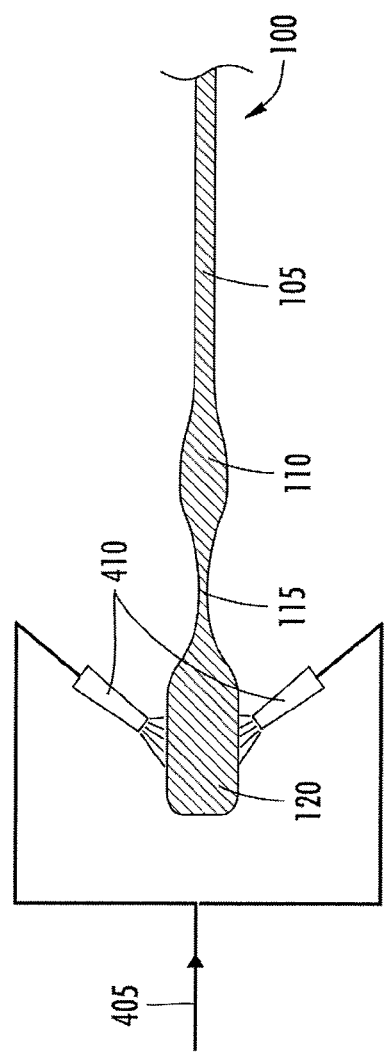
FIG. 9 shows a portion of the glass ribbon in cross-section as in FIG. 1 that illustrates a configuration having a fluid source (405) including a pair of cooling or heating gas nozzles (410) directed acutely at the outer bead (120).

FIG. 9 shows a portion of another configuration with a glass ribbon or the laminate glass ribbon in cross-section having the fluid source (405), such as the cooling or heating gas nozzles (410), directed at the outer bead (120) as in FIG. 8, but at an acute angle projection away from the ribbon, instead of an orthogonal projection, to minimize the thermal influence on the relatively thin nearby optional trough region (115) of the glass ribbon (100). The pair of nozzles is oriented at an acute angle and away from the center laminate region to minimize the thermal impact on the relatively thin nearby optional trough glass region (115). Only a portion of the right side or half of the glass ribbon and associated thermal control apparatus is shown.

Figure 10:
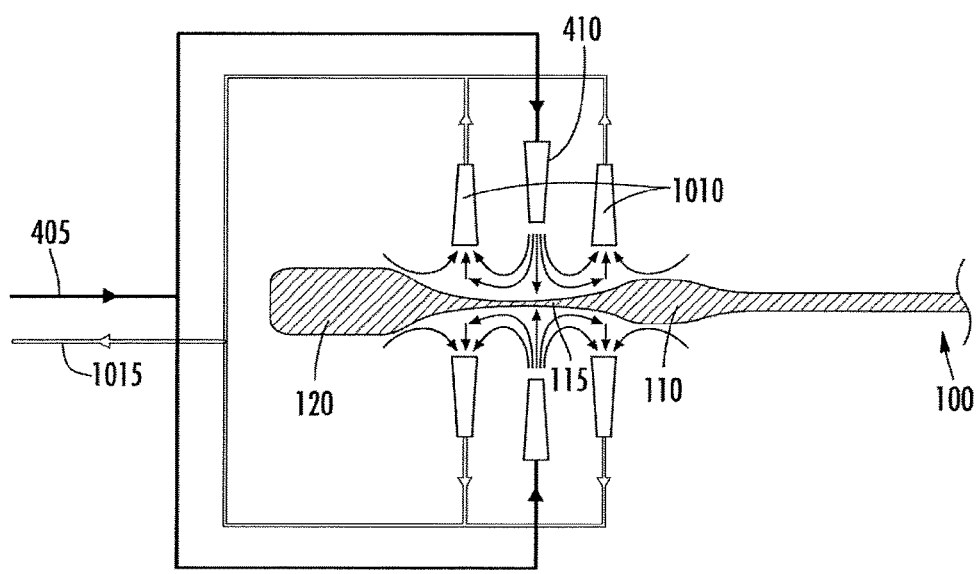
FIG. 10 shows another example configuration for alternatively or additionally thermally conditioning the relatively thin optional trough region (115), but with minimal impact on the nearby relatively thick inner bead (110) and outer bead (120) regions.

FIG. 10 shows another example configuration for alternatively or additionally thermal conditioning the relatively thin optional bead trough region (115), but having minimal impact on the nearby relatively thick inner bead (110) and outer bead (120) regions. The suction nozzles (1010), for example, in communication with a vacuum source (1015) can be situated, for example, in the vicinity of the thin trough region (115) and between the bead regions and near to the trough treatment nozzle(s) (410) to remove the conditioning gas once it has affected the desired region. This configuration can, alternatively or additionally, be applied to either of the beads. This embodiment, alternatively or additionally, also can be applied to conditioning either of the adjacent beads. Only a portion of the right side or half of the glass ribbon and associated thermal control apparatus is shown.

Figure 11:
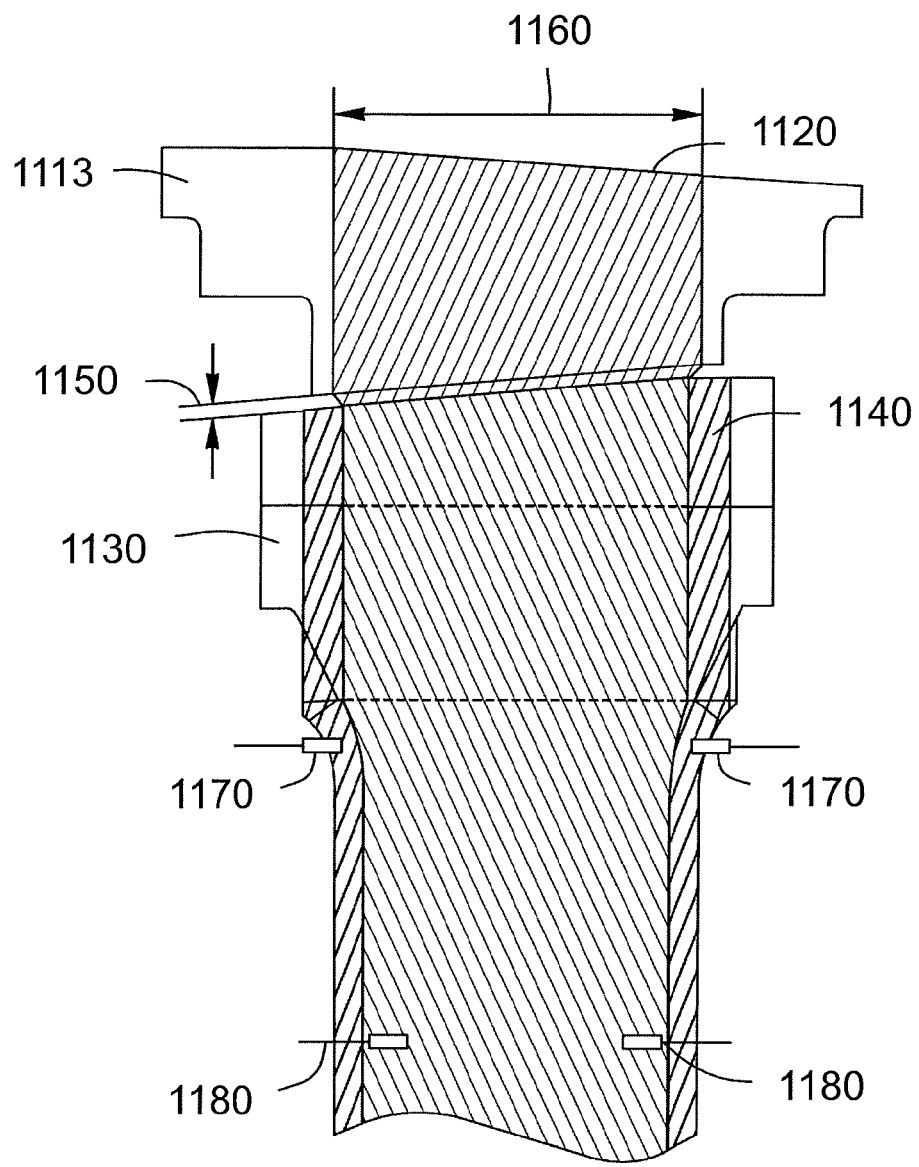
FIG. 11 is a schematic view of a portion of a laminate fusion draw glass fabrication apparatus and draw down region.

FIG. 11, by way of background, shows an exemplary side view of the PRIOR ART double fusion apparatus and process having a clad glass stream (1120) from the upper isopipe (1113) streaming onto the core glass stream (1140) from the lower isopipe (1130) across the gap (1150). FIG. 11 additionally shows the clad dam-to-dam dimension (1160), which can be varied if desired, optional edge rolls or edge roller pairs (ER)(1170) that can maintain consistency of or prevent attenuation of the width dimension of the core stream or the core glass sheet, and optional pull roll or puller roller pairs (PR)(1180) or tractor rolls that can maintain consistency of the laminate thickness and further regulate the speed of the lamination process.

Representative values for LCD glasses, specifically, Corning Incorporated's Code Eagle® 2000 LCD glass, the upper end of the glass transition temperature region (GTTR) is typically less than or equal to about 850° C. and the lower end of the GTTR is typically greater than or equal to about 650° C., e.g., the lower end of the GTTR can be greater than or equal to about 700° C. Edge rollers can contact the ribbon at a location above the GTTR, while pulling rolls are shown as being located within the GTTR. Pulling rolls can also be located below the GTTR, if desired (see commonly owned Corning patent, U.S. Pat. No. 8,037,716, to Aniolek, et al.). The temperature of the edge rollers can be below that of the glass, e.g., the edge rollers can be water or air cooled. As a result of this lower temperature, the edge rollers locally reduce the glass temperature. This cooling reduces the ribbon's attenuation, i.e., the local cooling helps control the reduction in the ribbon's width that occurs during drawing (e.g., through the action of pulling rolls). Pulling rolls are also generally cooler than the glass they contact, but because they are located further down the draw, the difference in temperature can be less than at the edge rollers.

As further shown in FIG. 11, the apparatus can used in the fusion process or as modified for laminate fusion draw and can be divided into a first section of the fusion draw machine (FDM) in which the air temperatures to which the glass is exposed are controlled and a second section bottom of draw (BOD) where the glass is exposed to the ambient temperature. The BOD includes a section where individual sheets can be separated from the ribbon along a score line.

Figure 12:
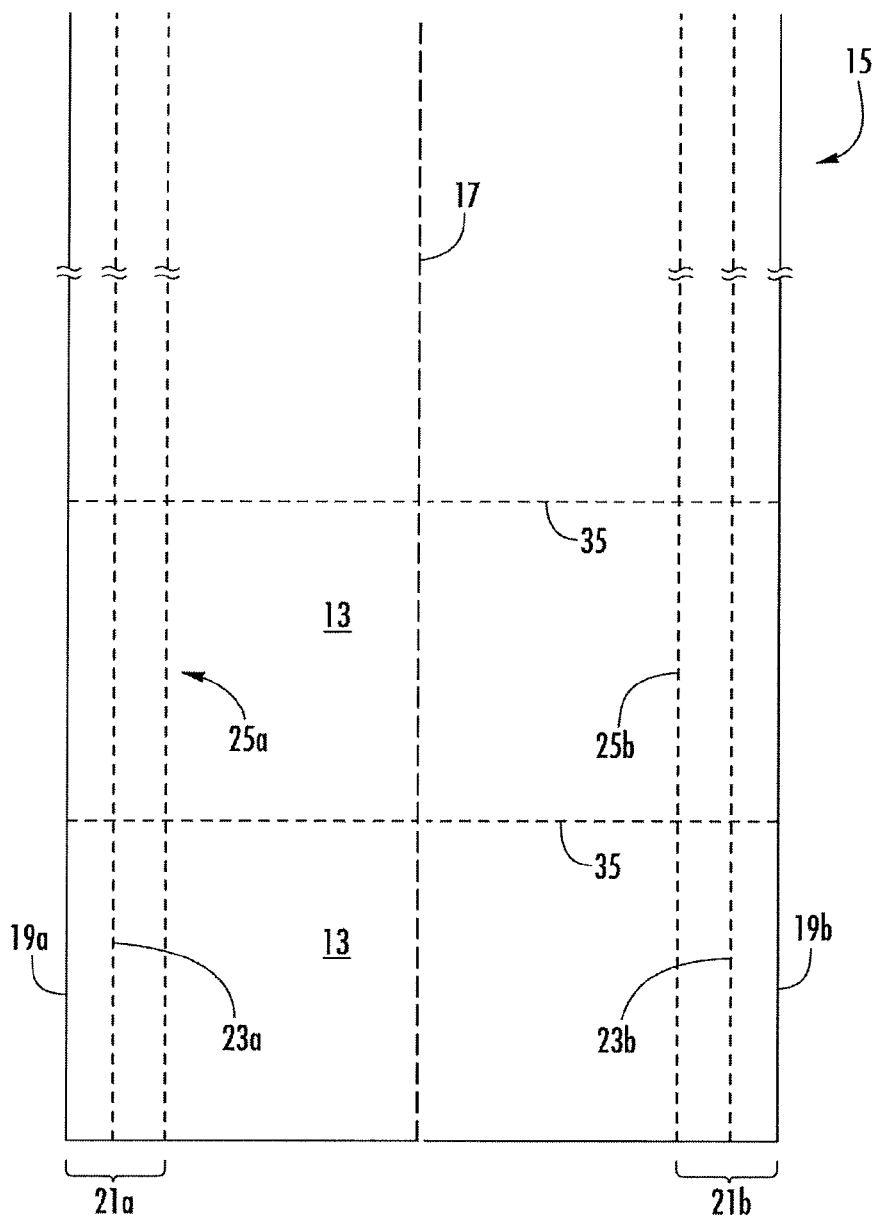
FIG. 12 is a schematic diagram illustrating a representative glass ribbon and associated regions formed by a drawing process.

FIG. 12 shows representative nomenclature used to describe the ribbon (15). In fusion draw, the ribbon can have outer edges (19a), (19b), a centerline (17), and bead portions (21a), (21b), which extend inward from the edges (19a and 19b), towards the centerline. The thickest part of the bead portion can occur along the line (23a and 23b) and the inner extent of the bead portion is taken to be along the line (25a and 25b), where the final thickness of the ribbon first rises above $1.05*t_{center}$, where $t_{center}$ the final thickness of the ribbon along the centerline. Note that a thickness of $1.05*t_{center}$ is considered to be a quality or near quality thickness. Also note that as discussed in WO 2007/014066, the final thickness occurs high in the draw, above the GTTR. Thereafter, the thickness decreases slightly as the glass cools based on the coefficient of thermal expansion (CTE). However, for purposes of the present disclosure, such CTE-based contraction can be ignored since it is less than a few tenths of a percent. Although bead portions (21a) and (21b) are shown as being symmetric, in practice bead portions can have different widths and the locations of their thickest parts can be different for the two beads, e.g., neither thickest part need be at the center of the bead portion. More generally, it should be noted that FIG. 11 is not to scale and is not intended to show relative sizes. In laminate fusion draw, the ribbon can additionally have inner bead portions, and an optional first and an optional second bead trough, as illustrated in the cross-section view of FIG. 1.

The disclosure has been described with reference to various specific embodiments and techniques. However, it should be understood that many variations and modifications are possible while remaining within the scope of the disclosure.

What is claimed:

1. An apparatus for making a laminate glass ribbon, the glass ribbon having:
   a center laminate region,
   a first edge,
   a second edge,
   a first bead portion which begins at the first edge and extends towards the center laminate region,
   a second bead portion which begins at the second edge and extends towards the center laminate region,
   the first bead portion and the second bead portion comprise the core glass on opposite edges of the laminate ribbon,
   a third bead portion which begins away from the first edge and extends towards the center laminate region,
   a forth bead portion which begins away from the second edge and extends towards the center laminate region,
   the third bead and the forth bead portions comprise the clad glass of the laminate glass ribbon,
   a first bead trough region between the first and third bead portions, and
   a second bead trough region between the second and fourth bead portions, the first and second bead trough regions comprise the core glass;
   the apparatus comprises:
   a bead thermal conditioning region in the laminate draw region including:
   a fluid source oriented to selectively apply a first fluid proximate to at least one of the first, second, third, or fourth bead portions, and the fluid source is oriented to selectively apply a second fluid to the bead trough regions of the laminate glass ribbon,
   wherein the fluid source comprises:
   a source of a cooled fluid directed toward the first and second beads, and the third and fourth beads; and
   a source of a heated fluid directed toward the first and second bead troughs.

2. The apparatus of claim 1 wherein the fluid source is situated in the visco-elastic zone, the elastic zone, or combinations thereof in the laminate draw region.

3. The apparatus of any of claim 1 wherein the fluid source comprises a first nozzle providing a source of cooling and a second nozzle providing a source of heating.

4. The apparatus of any of claim 1 wherein the fluid source comprises at least one fluid delivery nozzle oriented orthogonally toward the ribbon's long cross-section axis or oriented acutely with respect to the ribbon's long cross-section axis and projecting toward the ribbon edge and away from the center laminate region.

5. The apparatus of any of claim 1 wherein the fluid source comprises a plurality of fluid delivery nozzles oriented orthogonally toward the ribbon's long cross-section axis or oriented acutely with respect to the ribbon's long cross-section axis and projecting toward the ribbon edge and away from the center laminate region.

6. The apparatus of any of claim 1 wherein the fluid source comprises: a chilled gas, a heated gas, a chilled liquid, a heated liquid, a radiation source, or a combination thereof.

7. A method for bead thermal conditioning in the laminate fusion apparatus of claim 1 comprising:
   in the bead thermal conditioning region:
   directing a first fluid from the fluid source toward at least one of the first, the second, the third, and the fourth bead portions of a laminate glass ribbon; and
   simultaneously
   directing a second fluid from the fluid source toward the first and second bead trough portions, wherein the fluid source comprises a source of a cooled fluid directed toward the first and second beads, and toward the third and fourth beads, and a source of a heated fluid directed toward the first and second bead troughs.

8. The method of claim 7 wherein the bead thermal conditioning provides a laminate glass ribbon having a residual stress of from −1,000 psi to about +1,000 psi in the quality area.

9. The method of claim 7 wherein the bead thermal conditioning provides a laminate glass ribbon having a temporary stress below the fracture limit near the beads.

10. The method of claim 7 wherein the fluid source directed toward the first and second bead trough portions comprises a forced-air convection heater that localizes the temperature change in the respective bead trough portions.

11. The method of claim 10 wherein the temperature change is maintained within from 25 to about 100° C.

12. The method of claim 7 wherein the fluid is a gas.

13. The method of claim 12 wherein the gas is other than air.

14. The method of claim 13 further comprising at least one of water vapor, liquid water, non-aqueous liquid, or combinations thereof, in combination with the gas.

* * * * *